US009146948B2

(12) United States Patent
Grosset et al.

(10) Patent No.: US 9,146,948 B2
(45) Date of Patent: Sep. 29, 2015

(54) HILBERT ORDERING OF MULTIDIMENSIONAL TUPLES WITHIN COMPUTING SYSTEMS

(75) Inventors: Robin Grosset, Ottawa (CA); David Hood, London (GB)

(73) Assignee: International Business Machines Corporation, Armonk, NY (US)

( * ) Notice: Subject to any disclaimer, the term of this patent is extended or adjusted under 35 U.S.C. 154(b) by 1459 days.

(21) Appl. No.: 11/609,531

(22) Filed: Dec. 12, 2006

(65) Prior Publication Data

US 2008/0140682 A1   Jun. 12, 2008

(51) Int. Cl.
G07F 17/30 (2006.01)
G06F 17/30 (2006.01)

(52) U.S. Cl.
CPC .... *G06F 17/30327* (2013.01); *G06F 17/30333* (2013.01)

(58) Field of Classification Search
CPC ............... G06F 17/30327; G06F 17/30333
USPC ............... 707/3, 999.002, 736–757
See application file for complete search history.

(56) References Cited

U.S. PATENT DOCUMENTS

| 5,752,243 | A  | * | 5/1998  | Reiter et al. ................... 707/3   |
| 6,021,406 | A  | * | 2/2000  | Kuznetsov ...................... 707/6   |
| 6,154,746 | A  | * | 11/2000 | Berchtold et al. ............ 707/100 |
| 6,311,181 | B1 | * | 10/2001 | Lee et al. ....................... 707/5   |
| 6,460,026 | B1 | * | 10/2002 | Pasumansky ................. 707/1   |
| 6,470,287 | B1 | * | 10/2002 | Smartt ......................... 702/102 |
| 6,735,593 | B1 |   | 5/2004  | Williams                              |
| 7,321,890 | B2 | * | 1/2008  | Tropf ............................ 707/3   |
| 7,400,784 | B2 | * | 7/2008  | Joly ............................ 382/305 |
| 7,725,425 | B2 | * | 5/2010  | Smartt ......................... 1/1       |
| 2003/0004938 | A1 | * | 1/2003 | Lawder ........................ 707/3   |
| 2007/0156634 | A1 | * | 7/2007 | Martin ........................ 707/1   |

FOREIGN PATENT DOCUMENTS

EP   1 441 293 B1   8/2004

OTHER PUBLICATIONS

J.K. Lawder et al., "Querying Multi-dimensional Data Indexed Using the Hilbert Space-Filling Curve," Technical Report No. JL3/00, pp. 1-6 (Sep. 2000).
International Search Report and Written Opinion from corresponding PCT Application Serial No. PCT/US07/22784 mailed Jul. 3, 2008 (8 pages).
International Preliminary Report on Patentability from corresponding PCT Application Serial No. PCT/US07/22784 mailed Jun. 25, 2009 (7 pages).

* cited by examiner

*Primary Examiner* — Shew-Fen Lin
(74) *Attorney, Agent, or Firm* — Shumaker & Sieffert, P.A.

(57) ABSTRACT

A system provides multidimensional tuple Hilbert ordering within a linear storage structure to enable more consistent and efficient access to stored multidimensional tuples. The database system comprises a tuple storage module that receives multidimensional data elements, where each multidimensional data element is defined by a plurality of different object types, and where each object is associated with a different dimension within a multidimensional data space. The tuple storage module further forms a respective tuple for each of the multidimensional data elements by mapping each object to an associated reference and applies a Hilbert function to the references of each of the tuples to determine a respective Hilbert ordering for each of the tuples. The system further comprises a linear data storage structure that includes a B-tree for storing the Hilbert ordering.

15 Claims, 9 Drawing Sheets

HILBERT ORDERING OF MULTIDIMENSIONAL TUPLES WITHIN COMPUTING SYSTEMS

TECHNICAL FIELD

The invention relates to the storage of data, and more particularly, to storage of multidimensional data.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligent tools, enterprise reporting tools, project and resource management systems and other enterprise software systems.

Many enterprise performance management and business planning applications require a large population of users to enter data that the software then accumulates into higher level areas of responsibility in the organization. Typically, this data comprises multidimensional data where each element is stored as a tuple within the multi-dimensional data space, where the multidimensional tuple comprises a finite sequence of objects, each of a specified type. The system typically stores these multidimensional tuples within a B-tree or other tree data structure for efficient retrieval and maintenance.

Typically, the system stores the tuples to the B-tree or other data storage structure such that the tuples are sorted within the data structure based on one of the component objects of the multidimensional tuple. For example, multidimensional tuples may store objects having dimensions of types "Name," "Store," "Date," and "Product." In this example, multidimensional tuple may be referred to as quadruples as it comprises four objects. Moreover, the quadruples use the same unique reference for the "Name" for each multidimensional data element associated with a customer named "Fred," and may assign the references based on an order in which multidimensional data elements are added to the system. The system may store the tuples in the B-tree or other data structure in a sorted order based on these references for each dimension and in accordance with an order in which the multidimensional data elements were added to the system. As a result, other quadruples associated with multidimensional data elements for the customer Fred tend to be stored within the same portion of the B-tree and in a sorted order.

While sorting according to the "Name" object in the above example may facilitate quick retrieval of the stored quadruples when searching for tuples matching a given "Name," retrieval times of multidimensional tuples when searching along other dimensions, i.e., the "Store," "Date," or "Product" dimensions in the above example, may be considerably increased. In other words, retrieval times when searching along these dimensions may be sacrificed in view of the quick retrieval times when searching along the sorted object, i.e., the "Name" object. For example, searching the tuple storage structure along one of the other dimensions of the multidimensional tuple may require traversal of the entire storage structure in a linear manner. These inconsistencies impose unpredictable delays to locating tuples and subsequently retrieving multidimensional data and, therefore, may significantly affect the performance of enterprise applications that make use of the multidimensional data.

SUMMARY

The invention is directed to techniques that enable more consistent and efficient access of multidimensional tuples. For example, multidimensional tuple Hilbert ordering techniques are described that facilitate storage of multidimensional tuples to a tree structure (e.g., a B-tree) that may be stored within pages of a linear data storage structure. The techniques order the multidimensional tuples within the B-tree such that similar tuples remain local to one another within the same region of B-tree. By applying the Hilbert ordering function to the multidimensional tuples prior to storage, the tuples are ordered in the B-Tree in accordance with the Hilbert function even within individual pages or regions of the linear storage space, allowing the B-tree to grow in a balanced fashion.

Moreover, the tuples are arranged within the B-tree in a sorted order such that data searching and retrieval along any dimension of the multi-dimensional space is consistent, i.e., substantially equal. That is, the tuples are arranged within the B-tree according to the Hilbert function such that retrieval is independent of the particular references into the multi-dimensional data space. As database queries frequently request tuples similar in more than one respect, the techniques thereby enable more consistent and efficient access of multidimensional tuples regardless of the dimensions used to construct the search.

According to the techniques, a database system includes a tuple storage software module that determines the multidimensional tuples associated with a multidimensional data space. That is, each multidimensional tuple represents a unique, respective multidimensional element with the multi-dimensional data space. The tuple storage module determines a Hilbert ordering associated with the multidimensional tuples by applying a Hilbert function to each of the multidimensional tuple before storing the tuple within a tree structure, such as a B-tree. The tuple storage module stores the respective Hilbert value (also referred to as the respective Hilbert ordering) for each tuple within the B-tree and in a manner that the B-tree is sorted based on the Hilbert value. In this manner, the Hilbert ordering is not applied to the pages or nodes of the B-tree as they are written to storage, but rather to the tuples within the B-Tree.

In order to search and retrieve multidimensional tuples from the B-tree, the tuple storage module applies the Hilbert function to the requested multidimensional tuple(s) in order to determine its Hilbert ordering. Once determined, the tuple storage module traverses the B-tree within the linear storage space and retrieves any tuple(s) that match the requested Hilbert ordering(s). The tuple storage module then applies an inverse Hilbert function to transform the received Hilbert orderings back into their multidimensional tuple form, thereby restoring the Hilbert ordering to the multidimensional data element. The tuple storage module then returns the requested multidimensional tuples.

In one embodiment, a method comprises a method comprises receiving multidimensional data elements, where each multidimensional data element is defined by a plurality of different object types, and where each object is associated with a different dimension within a multidimensional data space. The method further comprises forming a respective tuple for each of the multidimensional data elements by mapping each object to an associated reference, and applying a Hilbert function to the references of each of the tuples to determine a respective Hilbert ordering for each of the tuples. Further, the method comprises storing the Hilbert orderings to a B-tree allocated within a linear data storage structure, wherein the tuples are arranged within the B-tree in a sorted order such that searching and retrieval of the tuples is substantially equal for two or more of the dimensions within the multi-dimensional space.

In another embodiment, a system comprises a tuple storage module that receives multidimensional data elements, where each multidimensional data element is defined by a plurality of different object types, and where each object is associated with a different dimension within a multidimensional data space. The tuple storage module further forms a respective tuple for each of the multidimensional data elements by mapping each object to an associated reference, and applies a Hilbert function to the references of each of the tuples to determine a respective Hilbert ordering for each of the tuples. The system further comprises a linear storage structure that includes a B-tree for storing the Hilbert orderings, wherein the tuples are arranged within the B-tree in a sorted order such that searching and retrieval of the tuples is substantially equal for two or more of the dimensions within the multi-dimensional space.

In another embodiment, a computer-readable medium containing instructions. The instructions cause a programmable processor to receive multidimensional data elements, where each multidimensional data element is defined by a plurality of different object types, and where each object is associated with a different dimension within a multidimensional data space. The instructions further cause the programmable processor to form a respective tuple for each of the multidimensional data elements by mapping each object to an associated reference and apply a Hilbert function to the references of each of the tuples to determine a respective Hilbert ordering for each of the tuples. Further, the instructions cause the processor to store the Hilbert orderings to a B-tree allocated within a linear data storage structure, wherein the tuples are arranged within the B-tree in a sorted order such that searching and retrieval of the tuples is substantially equal for two or more of the dimensions within the multi-dimensional space.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
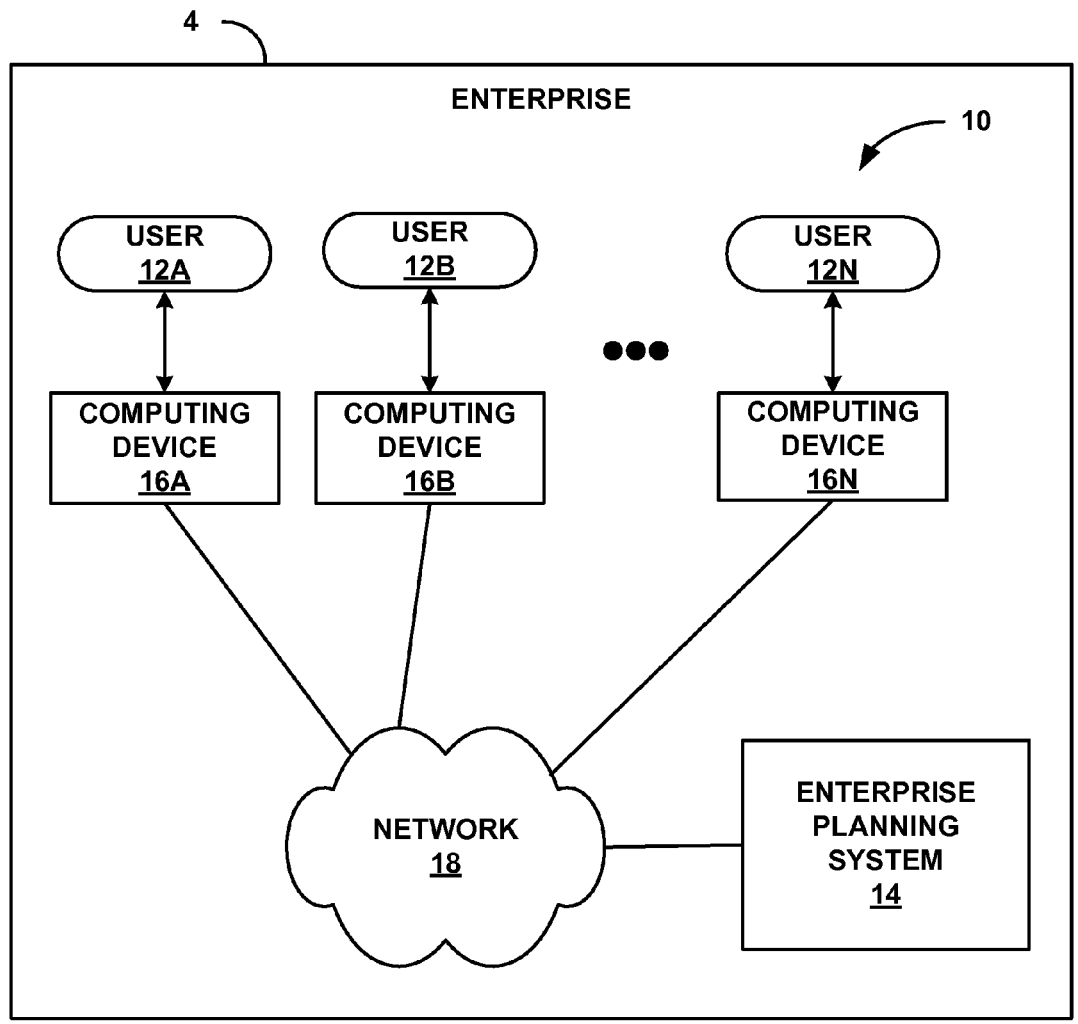
FIG. 1 is a block diagram illustrating an example enterprise having a computing environment in which a plurality of users interacts with an enterprise planning and performance management system.

FIG. 1 is a block diagram illustrating an example enterprise 4 having a computing environment 10 in which a plurality of users 12A-12N (collectively, "users 12") interact with an enterprise planning and performance management system 14. In the system shown in FIG. 1, enterprise planning and performance management system 14 communicatively couples to a number of computing devices 16A-16N (collectively, "computing devices 16") via a network 18. Users 12 interact with their respective computing devices to access enterprise planning and performance management system 14.

For exemplary purposes, the invention will be described in reference to an enterprise planning and performance management system, such as an enterprise financial or budget planning system. The techniques described herein may be readily applied to other software systems, including other large-scale enterprise software systems, that store multidimensional data to a linear storage structure within a database. Examples of enterprise software systems include order management systems, inventory management systems, sales force management systems, business intelligent tools, enterprise reporting tools, project and resource management systems and other enterprise software systems. Other exemplary systems may include networked systems, such as web server systems, that include a database to store and retrieve multidimensional data, such as web content. In this example, enterprise planning and performance management system 14 enables and automates the reconciliation of top-down targets with detailed bottom-up forecasts for an enterprise.

Typically, users 12 view and manipulate multidimensional data via their respective computing devices 16. The data is "multidimensional" in that each multidimensional data element is defined by a plurality of different object types, where each object is associated with a different dimension. Users 12 may, for example, enter data related to store sales by entering a name of the salesman, a store identifier, a date, and a product sold, as well as, the price at which the product was sold, into their respective computing devices 16. In this example, a four-dimensional data element may comprise objects of type "Name," "Store," "Date," and "Product," where each of the types represent a dimension and the data stored to each object represents a value along each respective dimension. The multidimensional data element may also be associated with other relevant data. In the above example, an element may be further associated with a "Price" measure, which indicates the price paid by the person with the identified name for the identified product at the identified store on the identified date.

As described herein, computing devices 16 and/or enterprise planning system 14 store the multidimensional data in the form of one or more B-trees. More specifically, the system determines multidimensional tuples associated with the multidimensional data space. Each multidimensional tuple represents a unique respective multidimensional element with the multidimensional data space. To facilitate this standardization process in these embodiments, client device 16 may maintain data dictionaries that store the mappings between object values and identifiers, or references. For example, computing devices 16 may represent names as unique integer identifiers, e.g., the name "Fred" is represented by name identifier "1," and product names also as unique integer identifiers, e.g., a product named "mat" is represented by product name identifier "4."

In other embodiments, users 12 may interact with web browsers executing within client computing devices 16 to enter and transmit data directly to enterprise planning and performance management system 14, which organizes the data into associated multidimensional tuples and performs the standardizing operations. As described below in more detail, enterprise planning and performance e management system 14, in these embodiments, may maintain these data dictionaries for each dimension that contains a mapping between the data and its unique identifier, or reference. Enterprise planning and performance management system 14 may access the data dictionaries to determine this mapping, thereby standardizing the entered data. Thus, a standardized multidimensional tuple comprises a plurality of references, i.e., unique identifiers within each of the defined dimensions, that identify a location of a multidimensional element within a multidimensional data space.

Figure 2:
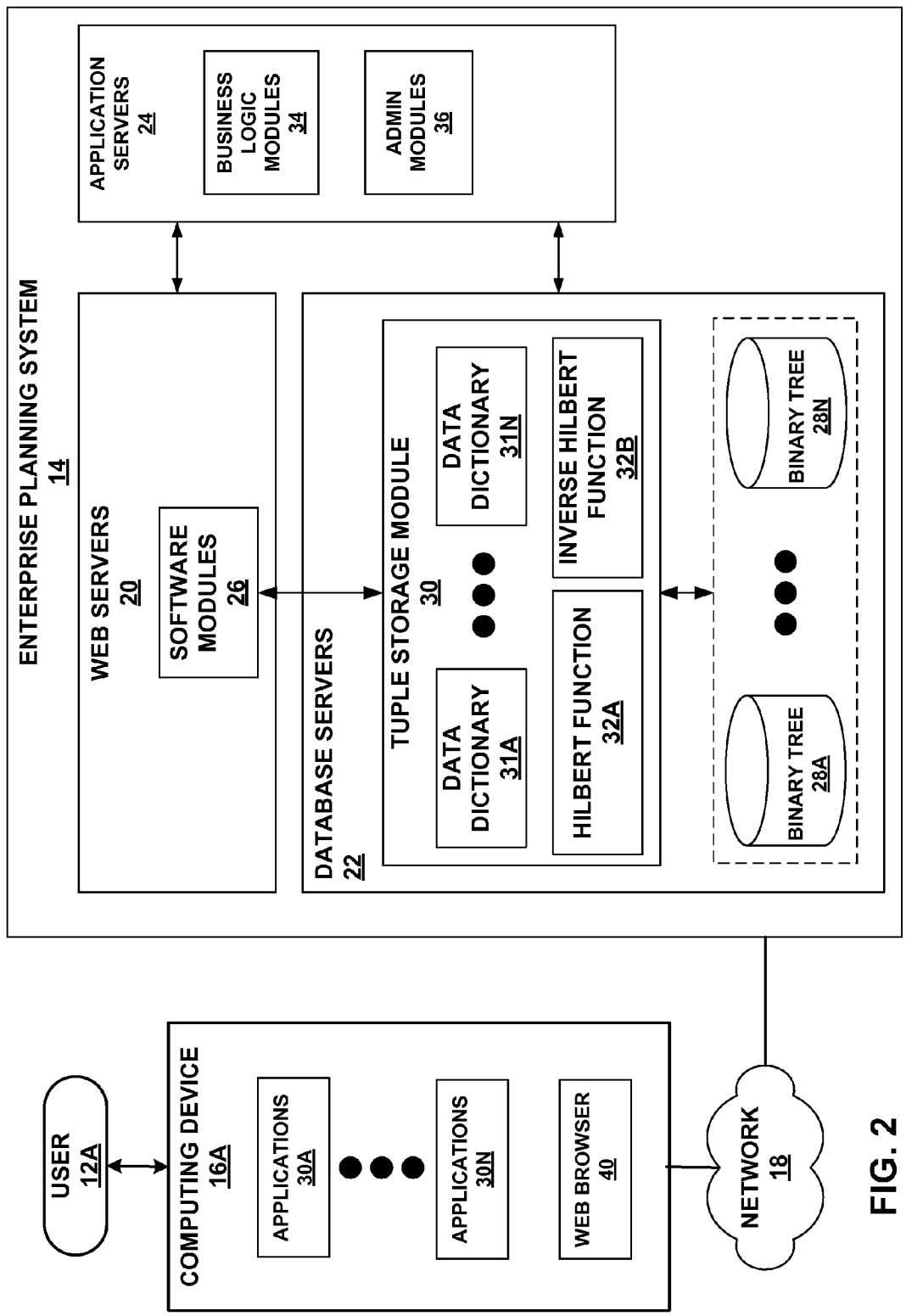
FIG. 2 is a block diagram illustrating one embodiment of a computing device for interacting with an exemplary embodiment of enterprise planning system.

Enterprise planning and performance management system 14 includes a database, as shown in more detail in FIG. 2, to which it stores the aggregated standardized multidimensional tuples. The database stores the standardized multidimensional tuples according to a linear storage structure. A linear storage structure comprises any database storage structure that allows for sequentially storing data to a linear storage space, such as in memory or on a hard drive. Exemplary linear storage structures include trees, hash tables, arrays, and linked lists. Typically, the database utilizes a B-tree storage structure.

In order to store the standardized multidimensional tuple to the B-tree within the database, enterprise planning and performance management system 14 first transforms the standardized multidimensional tuple according to a Hilbert function. The Hilbert function determines a unique Hilbert ordering associated with the standardized multidimensional tuple. More specifically, the Hilbert function may be applied to the set of constituent multidimensional references for the tuple to produce a Hilbert ordering for the tuple. In one exemplary embodiment, the Hilbert function is applied to the references for all of the dimensions.

In another exemplary embodiment, the Hilbert function is applied to a subset of the references of the tuple, such as to only references for larger dimensions or higher-priority dimensions of the data cube. That is, the subset of references to which to apply the Hilbert function may be selected based on a size of the respective dimension of the data cube for each of the references. This may ensure that the potential benefits of application of the Hilbert function is balanced with the additional processing required by the Hilbert function. For example, assume one goal is to locate data relating to the same date at one end of the BTree (which may be the case if the data is used more frequently in aggregations or if users tend to look at the last days data most of the time). This may be accomplished by sorting by date first, and then sorting on the Hilbert number for all the other dimensions. This evenly distributes the dimensional data for each date. In other words, the B-tree would have an underlying date order which overrules the hilbert ordering. Hence, if users access only this year's data or some other more current data, the data would all be located at a certain part of the B-Tree and within this part the spacial locality for other dimensions is preserved.

In this manner, the techniques described herein make use of characteristics of the Hilbert function so that tuples can be stored in a linear storage structure in a manner that has consistent retrieval and that is independent of the individual reference values.

Thus, by way of the Hilbert function, each unique multidimensional tuple is associated with a unique Hilbert ordering. Upon generating the Hilbert ordering, enterprise planning and performance management system 14 stores the standardized multidimensional tuple to the B-tree according to the Hilbert ordering, i.e., by storing the Hilbert ordering that uniquely represents the standardized multidimensional tuple to the B-tree.

In order to retrieve a requested multidimensional tuple stored to the B-tree within the database, enterprise planning and performance management system 14 maps the requested object values to the unique references via the data dictionaries and transforms the requested references via the Hilbert function to the Hilbert orderings. After determining the Hilbert orderings, enterprise planning and performance management system 14 utilizes the Hilbert orderings as keys by which it can search the B-tree within the database for the requested multidimensional tuples. Upon finding the requested Hilbert ordering within B-tree, enterprise planning and performance management system 14 invokes an inverse Hilbert function that transforms the requested Hilbert ordering stored to the B-tree into the representative references, or standardized multidimensional tuple, whereupon it maps the representative references back into the object data via the data dictionaries, thereby forming the requested multidimensional tuple. Alternatively, if the Hilbert number for the desired data is known, the retrieval process can be performed without requiring the inverse operation. That is, records can be matched based on the Hilbert number.

As described in more detail below, the Hilbert ordering is used herein to ensure a measure of locality among similar data points along any given dimension. For example, given the exemplary quadruple above, a Hilbert function is applied to map the dimensional references for a given tuple into the linear space of a B-tree in a manner that facilitates consistent access times to multidimensional tuples stored within the B-tree. Application of the Hilbert function, and its uniform space filling properties, for storing tuples within a B-tree allows the techniques describe herein to allocate and store the tuples in a manner that is "sorted" independent of the object values of the corresponding multidimensional data. Thus, by way application of Hilbert ordering when allocating and storing tuple references to multidimensional data, enterprise planning and performance management system 14 may more consistently and quickly access the tuples stored to a linear storage structure within a database, such as the B-tree, thereby facilitating consistent application performance and system usability.

Although described in reference herein to use of a Hilbert function for distributing the tuples within the B-tree, the principles of the invention may make use of other data allocation functions provided the functions have an inverse function (i.e., the function can be reversed to as to transform in the opposite direction), and provided the functions allow the tuples stored in a linear storage structure allocated throughout the storage structure so that traversal and retrieval is consistent and independent of the individual object values for the multidimensional data associated with the tuples.

Enterprise users 12 may utilize a variety of computing devices to interact with enterprise planning and performance management system 14 via network 18. For example, an enterprise user may interact with enterprise planning and performance management system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning and performance management system 14 via a local area network, or may remotely access enterprise planning and performance management system 14 via a virtual private network, remote dial-up, or similar remote access communication mechanism.

FIG. 2 is a block diagram illustrating one embodiment of a computing device 16A for interacting with an exemplary embodiment of enterprise planning system 14. As shown in the illustrated embodiment, enterprise planning and performance management system 14 includes web servers 20, database servers 22, and application servers 26. Also, as shown in the illustrated embodiment, computing device 16A includes applications 38A-38N ("applications 38") and web browser 40. Although only one computing device is illustrated in FIG. 2, i.e., computing device 16A, for ease of illustration purposes, the other computing devices, i.e., computing devices 16B-16N, may be substantially similar to computing device 16A.

Web servers 20 provide an interface for communicating with user 12 via network 18. Web servers 20 execute web server software, such as Internet Information Server™ from Microsoft Corporation, of Redmond, Wash. As such, web servers 20 provide an environment for interacting with users 12 according to software modules 26.

Software modules 26 may comprise Lotus scripts, Java scripts, Java Applets, Active Server Pages, web pages written in hypertext markup language (HTML) or dynamic HTML, Active X objects, and other suitable modules. Web servers 20 serve up web pages defined by software modules 26, and communicate the web pages to computing devices 16 of enterprise users 12. The web pages may include static media, such as text and graphic imagery, as well as conventional input media such as text entry boxes, radio buttons, drop-down menus and the like, for receiving data from enterprise users 12.

Software modules 26 interact with database servers 22 to access enterprise data, i.e., multidimensional tuples, stored to B-trees 28A-28N ("B-trees 28") via tuple storage module 30 of database servers 22. Typically, B-trees 28 comprise on-line analytical processing (OLAP) databases and store the multidimensional tuples according to a linear storage structure, such as a B-tree. Tuple storage module 30 comprises data dictionaries 31A-31N ("data dictionaries 31"), software to apply a Hilbert function 32A, and software to apply an inverse Hilbert function 32B. Data dictionaries 31, as described above, maintain a mapping between entered data and references for each dimension. Typically, data dictionaries 31 maintain these mappings within B-tree data storage structures. Each of data dictionaries 31 may maintain separate mappings for each of the dimensions of the multidimensional tuples. Hilbert function 32A and inverse Hilbert function 32B implement respectively an algorithm for determining a Hilbert ordering from a multidimensional tuple and an algorithm for determining multidimensional tuple object data from a Hilbert ordering.

Application servers 24 provide an operating environment for execution of business logic modules 34, which provide functionality for accessing and processing the data stored within B-trees 28 in response to software modules 26. In particular, business logic modules 28 comprise software routines for implementing the enterprise planning functions, and are invoked by software modules 26. Application servers 24 may also provide an operating environment for execution of administration modules 36, which comprise software routines for carrying out various administrative tasks within the enterprise planning and performance management system 14.

Turning to computing device 16A, applications 38 may include reporting tools, modeling tools, spreadsheet applications, data collection templates, business intelligence tools, or other types of enterprise planning applications. Web browser 40 of computing device 16A may comprise any typical web browser, such as one of those described above.

Typically, user 12A interacts with web browser 40 to enter and manipulate enterprise data, i.e., multidimensional tuples. In some embodiments, user 12A may interact with applications 38 to enter and manipulate the multidimensional tuple, whereupon user 12A may upload these multidimensional tuples upon finishing editing the tuples. Upon either entering or uploading the multidimensional tuples, user 12A may indicate that enterprise planning and performance management system 14 store the multidimensional tuples. In some embodiments, enterprise planning and performance management system 14 may automatically store any entered or uploaded tuples.

Upon receiving the multidimensional tuples, web servers 20, and more particularly, software modules 26 initiate the multidimensional tuple storage sequence. Software modules 26 may, in some embodiments, receive a plurality of data from user 12A instead of multidimensional tuples, which it organizes into multidimensional tuples. Software modules 26, first, transmit the multidimensional tuple to database servers 22, whereupon database servers 22 pass the multidimensional tuple to tuple storage module 30. To store the multidimensional tuple, tuple storage module 30 first standardizes the objects of the multidimensional tuple by mapping the objects of each dimension of the multidimensional tuple to their appropriate references according to data dictionaries 31. If an object is not present in the mappings maintained within data dictionaries 31, tuple storage module 30 may add the data object to the mapping by assigning a new reference to the object and storing the mapping within the appropriate one of data dictionaries 31. Once standardized, the multidimensional tuple, therefore, comprises a plurality of references that identify a location of the multidimensional element within a multidimensional space.

Next, tuple storage module 31 invokes Hilbert function 32A in order to determine the associated Hilbert ordering of the standardized multidimensional tuple. Hilbert function 32A transforms each of the multidimensional tuples into a respective Hilbert ordering, which typically consists of a single integer number, also referred to herein as the Hilbert value. In one exemplary embodiment, the Hilbert function is applied to the references for all of the dimensions. In another exemplary embodiment, the Hilbert function is applied to a subset of the references of the tuple, such as to only to references for larger dimensions of the data cube. In this case, the resultant Hilbert value replaces the subset of references in the tuple to which the Hilbert function is applied.

Upon determining the Hilbert ordering number, tuple storage module 30 causes database servers 22 to insert the Hilbert ordering number into one of B-trees 28. Typically, database servers 22 insert the Hilbert ordering number into a B-tree storage structure within the appropriate one of B-trees 28.

To retrieve stored multidimensional tuples, user 12A may interact with enterprise planning and performance management system 14 via web browser 40 to request either a single or series of stored multidimensional tuples. Typically, the request specifies one or more object values to identify either the single or series of multidimensional tuples. For example, given the above exemplary quadruple, the request may specify multidimensional element having "Name" object values that match "Fred," "Chris," and "Matt." This exemplary request therefore requests all quadruples with salesman named "Fred," "Chris," and "Matt."

Upon receiving the request, software modules 26 forward the request to database servers 22. In some embodiments, software modules 26 may receive data, or object values, from user 12A, which it then formulates into the request. Database servers 22 pass the request to tuple storage module 30, which standardizes the request by accessing data dictionaries 31 to obtain the appropriate references associated with the requested object values. For example, data dictionaries 31 may return references 1, 5, and 7, which correspond to the name object values "Fred," "Chris," and "Matt." Upon standardizing the request, tuple storage module 30 invokes Hilbert function 32A. Hilbert function 32A implements an algorithm that transforms the object values into either a single or series of Hilbert orderings. A series of Hilbert ordering may be necessary to account for incomplete information, such as in the above exemplary request where user 12A only specifies the name values. Upon transforming the requested references, tuple storage module 30 passes the Hilbert orderings to database servers 22, which in turn utilize the Hilbert orderings as keys to search for the requested stored Hilbert orderings.

Once the requested stored Hilbert orderings are found, database servers 22 pass the requested stored Hilbert orderings to tuple storage module 30, which invokes inverse Hilbert function 32B. Inverse Hilbert function 32B transforms the requested stored Hilbert orderings back to their standardized multidimensional tuple forms. In other words, inverse Hilbert function 32B transforms each of the Hilbert orderings into a plurality of references that identify a location of the requested multidimensional element within the multidimensional space. Next, tuple storage module once again accesses data dictionaries 31 to map the plurality of references of the standardized multidimensional tuple back to their ordinary object values, thereby forming the requested multidimensional tuple. Tuple storage module 30 passes these requested multidimensional tuples to database servers 22, which in turn passes them to web servers 20, which proceeds to communicate them back to computing device 16A and user 12A.

In this manner, enterprise planning and performance management system 14 implements multidimensional tuple Hilbert ordering to store multidimensional tuples such that they are "sorted" along all dimensions unlike conventional database storage systems that sort along a single object value or dimension of a multidimensional tuple. As described below in more detail, the space filling property of the Hilbert function and its inverse function enable this consistent database storage technique such that regardless of what dimension users 12 request, database servers 22 may return an appropriate result without resorting to linear searching. Thus, enterprise planning and performance management system 14 ensures a consistent user experience while possibly improving overall system performance.

Figure 3:
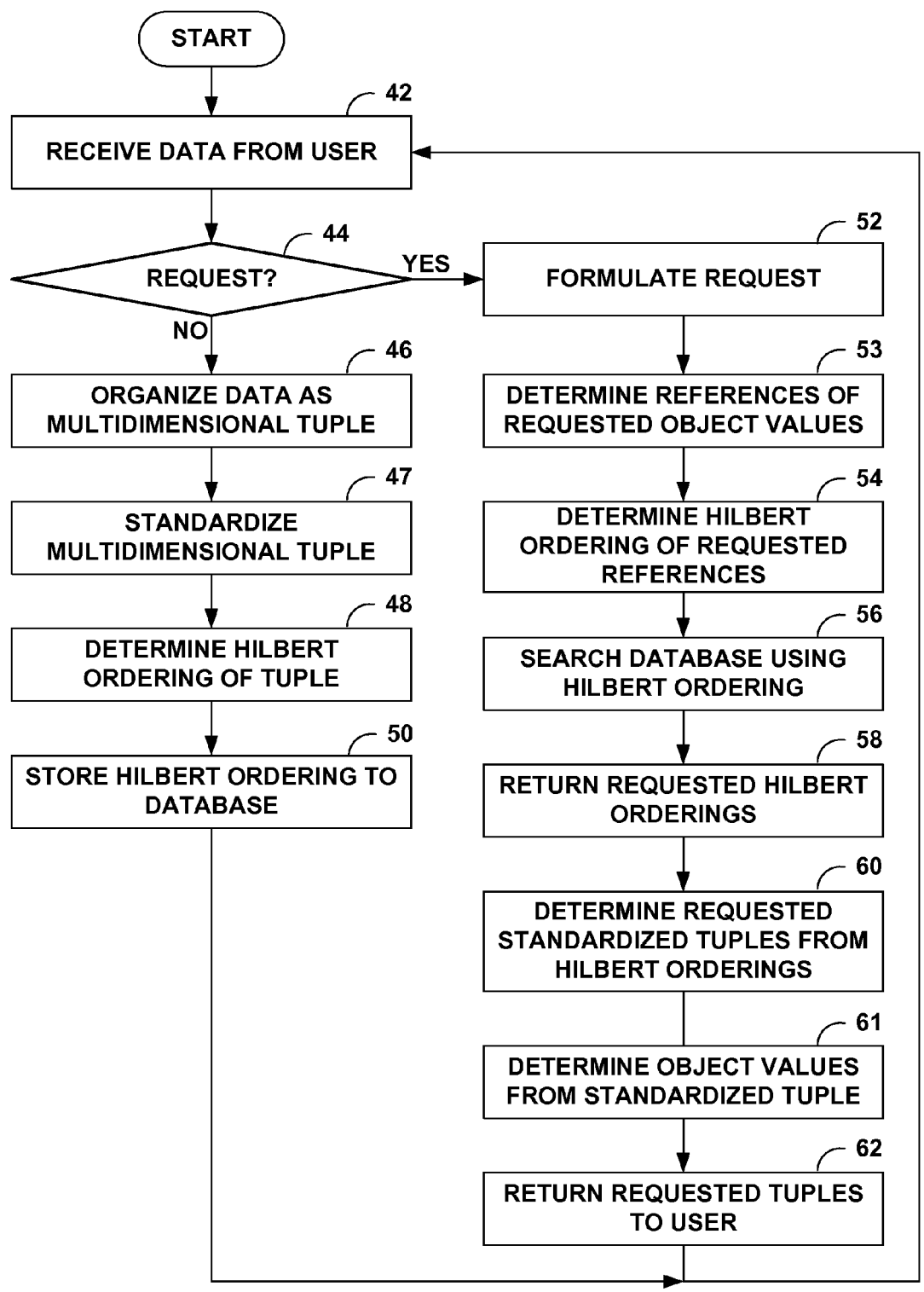
FIG. 3 is a flowchart illustrating an example operation of an enterprise planning and performance management system in implementing multidimensional tuple Hilbert ordering.

FIG. 3 is a flowchart illustrating an example operation of an enterprise planning and performance management system in implementing multidimensional tuple Hilbert ordering. Although described in reference to enterprise planning and performance management system 14 of FIG. 2, the principles of the invention should not be limited to the described embodiments and may include any system capable of storing multidimensional data to a B-tree storage structure within a database.

Initially, user 12A may interact with web browser 40 of computing device 16A to enter data. Web browser 40 may upload the data to enterprise planning and performance management system 14, whereupon software modules 26 receive the data from user 12A (42). Software modules 26 may determine whether the received data represents a request for multidimensional tuples stored to B-trees 28 or whether the data represents one or more multidimensional tuples to store to B-trees 28. If software modules 26 determine that it is not a request ("NO" 44), software modules 26 organize the data as a multidimensional tuple (46). Once organized, software modules 26 forward the multidimensional tuple to database servers 22, which pass the multidimensional tuple to tuple storage module 30.

Tuple storage module 30 first accesses data dictionaries 31 to standardize the multidimensional tuples into a small, manageable element in which the data is represented by reference values, thereby forming a standardized multidimensional tuple that represents the respective multidimensional element within the multidimensional space (47). Next, tuple storage module 30 invokes Hilbert function 32A to determine a Hilbert ordering associated with the plurality of references of the standardized multidimensional tuple (48). After determining the Hilbert ordering, tuple storage module 30 passes the Hilbert ordering to database servers 22, which store the standardized multidimensional tuple to a B-tree data structure within one of B-trees 28 in the form of the Hilbert ordering (50).

If, however, software modules 26 determine that the data represents a request for stored multidimensional tuples, software modules 26 may formulate the request (52). Once formulated, software modules 26 pass the request to database servers 22, which in turn pass the request to tuple storage module 30. Tuple storage module 30 first accesses data dictionaries 31 to determine associated references of the requested object values (53). Next, tuple storage module 30 invokes Hilbert function 32A to determine the Hilbert ordering associated with the requested references (54). As described above, the request may indicate a series of multidimensional tuples in some instances, and tuple storage module 30 may determine a series of corresponding Hilbert orderings in these instances.

Next, tuple storage module 30 passes the Hilbert ordering to database servers 22, which perform the search for the requested multidimensional tuple within B-trees 28 using the Hilbert ordering as a key. Once found, B-trees 28 return the requested multidimensional tuple as represented by its Hilbert ordering (56). Database servers 22 pass this representative Hilbert ordering to tuple storage module 30, which in turn invokes inverse Hilbert function 32B to transform the representative Hilbert ordering back to its standardized multidimensional tuple form (60). Upon receiving these standardized multidimensional tuples, tuple storage module 30 determines the object values from the standardized tuples by accessing data dictionaries 31 to map the references of the standardized multidimensional tuples back to their original object value, e.g., map reference "1" back to "Fred." Database servers 22 return the multidimensional tuple to user 12A via web servers 20 and network 18 (62). Regardless of whether the data represented a request or storage operation, enterprise planning and performance management system 14 awaits further data from users 12 (42).

Figure 4A:
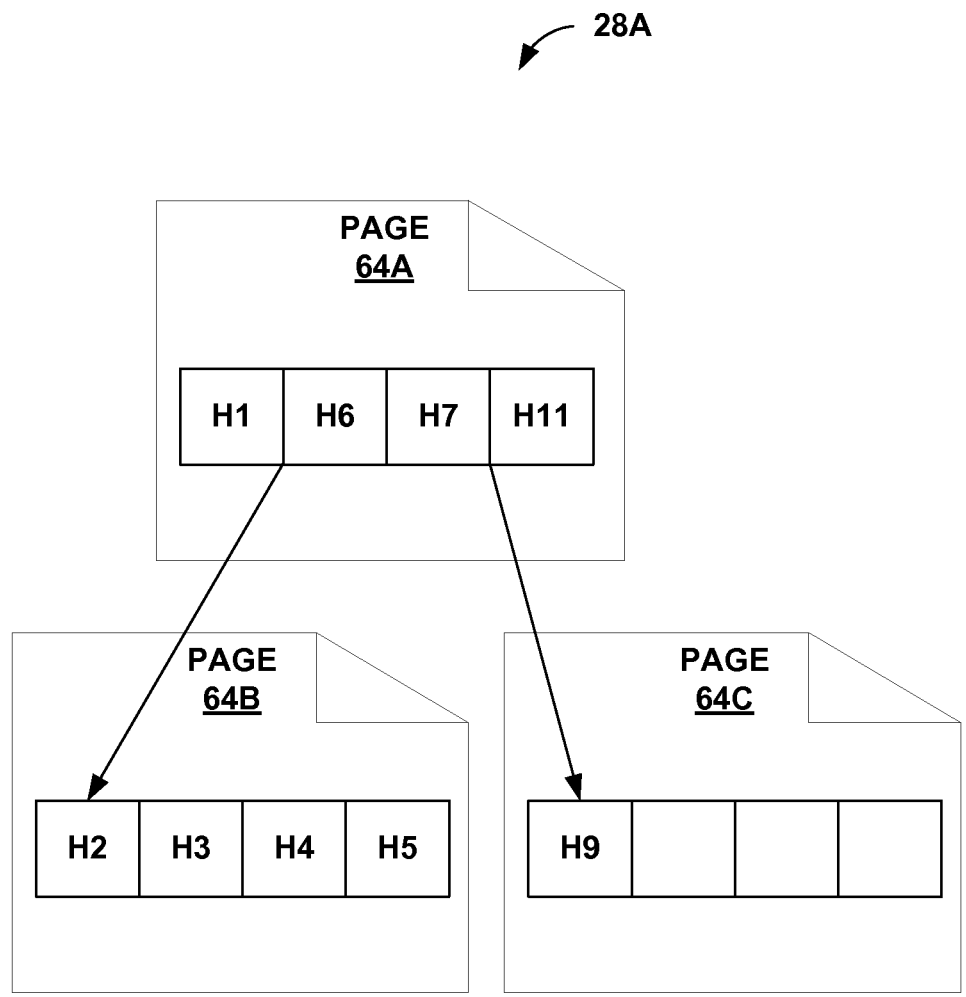
FIGS. 4A-4C are block diagrams illustrating exemplary operation of enterprise planning and performance management in storing a multidimensional tuple according to the multidimensional tuple Hilbert ordering principles discussed herein.
Figure 4B:
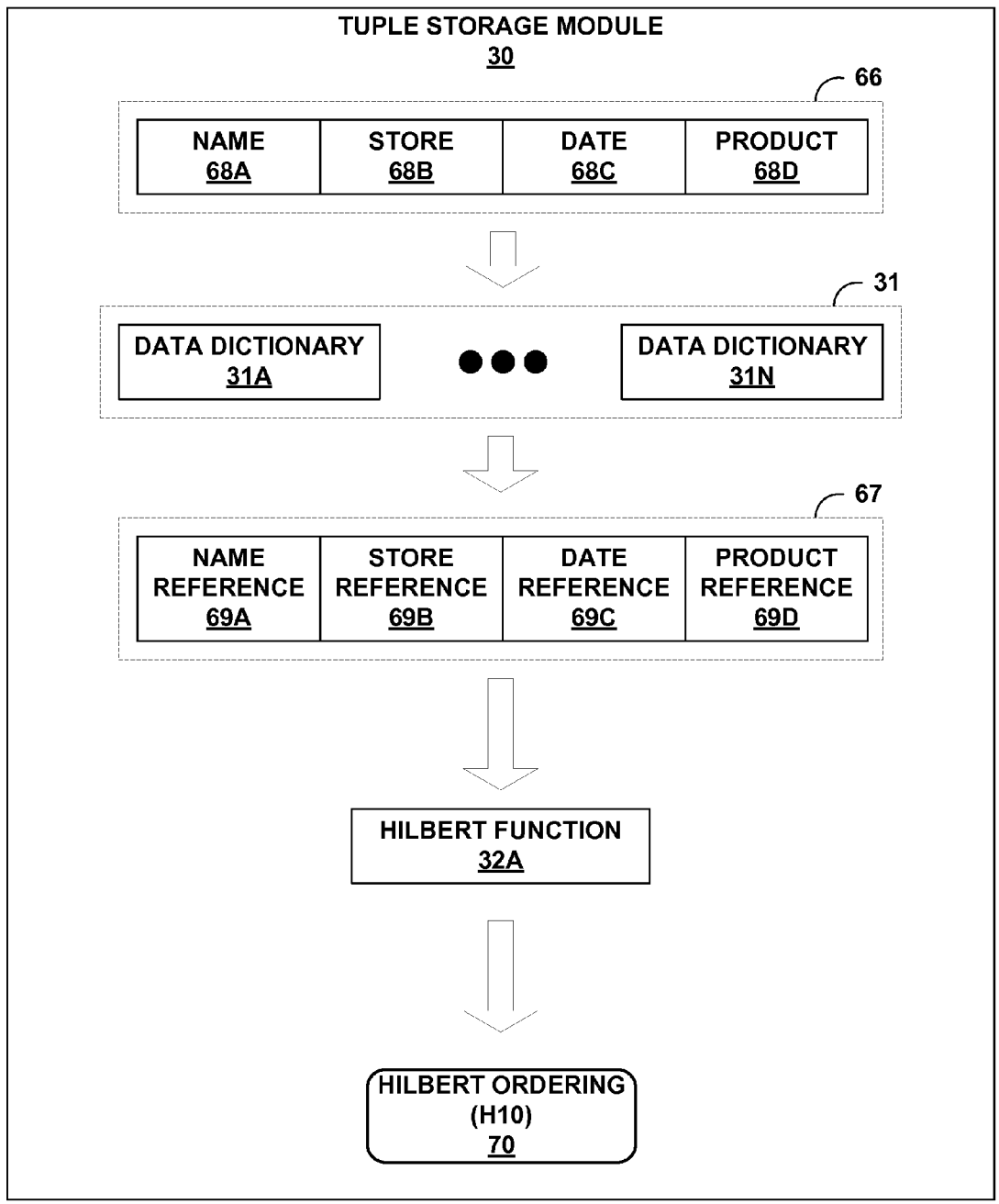
Figure 4C:
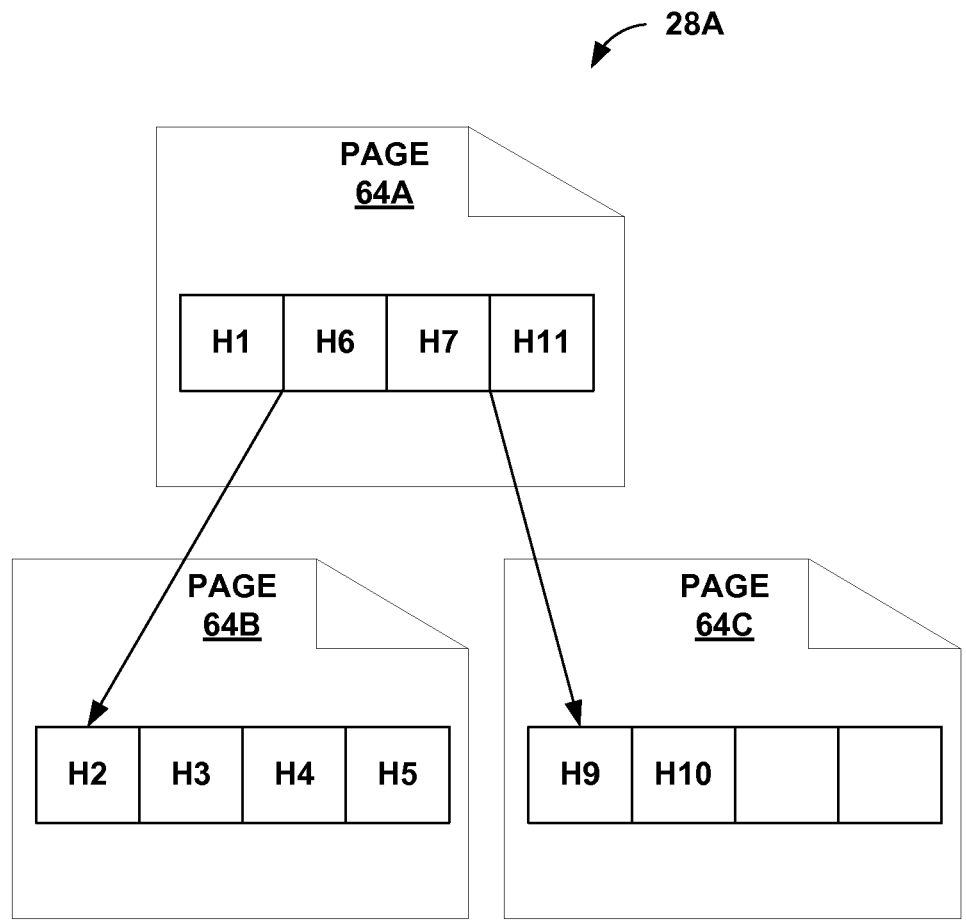

FIGS. 4A-4C are block diagrams illustrating exemplary operation of enterprise planning and performance management 14 in storing a multidimensional tuple according to the multidimensional tuple Hilbert ordering principles discussed herein. FIG. 4A illustrates an exemplary initial state of B-trees 28A residing within enterprise planning and performance management system 14.

As shown in FIG. 4A, B-trees 28A comprises databases pages 64A-64C ("pages 64"), each of which comprises a number of records. Page 64A includes records labeled H1, H6, H7, and H11. Page 64B includes records labeled H2-H5, and page 64C includes a record labeled H9, as well as, three vacant records with no label. The label reflects that a Hilbert ordering is stored to the record. Other relevant information may also be stored within the record. For example, as discussed above, the price associated with the exemplary quadruple described above may be stored within the record alongside the Hilbert ordering. The structure of pages 64 represents a typical B-tree structure. It is assumed for ease of illustration purposes that B-trees 28A has balanced the B-tree and reordered all records to adhere to the typical B-tree ordering. Thus, the record labels suggest the relative Hilbert order, with H1 representing that the lowest relative Hilbert ordering is stored to its record and H11 representing the highest relative Hilbert ordering is stored to its record.

FIG. 4B illustrates tuple storage module 30 of enterprise planning and performance management system 14 upon receiving a multidimensional tuple 66. Multidimensional tuple 66 is an example of the exemplary quadruple discussed above in that it comprises four objects 68A-68D associated with the above mentioned dimensions, i.e., "Name," "Store," "Date," and "Product." Objects 68A-68D each store a value, such as "Fred" for "Name" object 38A.

As described above, tuple storage module 30 first accesses data dictionaries 31 to standardize objects 68A-68D, i.e., map the values stored to objects 68A-68D to their associated references. The result of this standardization is shown in FIG. 4B as standardized multidimensional tuple 67, which includes a plurality of references 69A-69D. References 69A-69D identify the location of the multidimensional element within the multidimensional space. Next, tuple storage module 30 invokes Hilbert function 32A to determine Hilbert ordering (H10) 70 associated with standardized multidimensional tuple 67. The "(H10)" of Hilbert ordering 70 indicates the determined Hilbert ordering relative to those stored to the records of pages 64.

Hilbert function 32A performs mathematical operations to subdivide an n-dimensional space, e.g., a 4-dimensional space in the instance of a quadruple, into equally-sized discreet spaces. Hilbert function 32A determines a line through these equally-sized discreet spaces by connecting the center of each space according to a space filling algorithm. Hilbert function 32A may continually subdivide these spaces to allocate new points along the line, thereby filling the spaces recursively.

In the context of a quadruple, Hilbert function 32A calculates a point along the Hilbert line for each multidimensional tuple, and this point is referred to as its Hilbert ordering. Typically, the Hilbert ordering refers to an intersection point between two line segments. To properly utilize Hilbert function 32A, an administrator may, in some embodiments, first define the size of the space to which Hilbert function 32A applies, i.e., set the maximum and minimum identifier values for each of objects 68A-68E. Once the space has been defined, Hilbert function 32A may subdivide the space such that a proper number of points, or Hilbert ordering numbers, exist to store all of the combinations of the identifiers stored to objects 68A-68E. Therefore, upon receiving multidimensional tuple 66, Hilbert function 32A maps multidimensional tuple 66 to its associated Hilbert ordering 70, and passes Hilbert ordering 70 to database servers 22, which insert Hilbert ordering 70, or H10, into B-trees 28A, as well as, any other relevant information. In other embodiments, the above process by which an administrator defines the limits of each dimension may be performed automatically by enterprise planning and performance management system 14 via scripts or other such automated computational processes.

FIG. 4C illustrates the result of database servers 22 insertion of Hilbert ordering 70, or H10, into B-trees 28A. Database servers 22 insert Hilbert ordering 70 into B-trees 28A according to standard B-tree insertion techniques. Because H10 is a smaller number relative to H11, B-trees 28A stores H10 in page 64C after H9. According to conventional B-tree storage techniques, had page 64C been full, B-trees 28A would allocate another page, link the page appropriately to reflect the ordering, insert the Hilbert ordering 70 (H10) into the new page, and rebalance the B-tree. Thus, multidimensional tuple Hilbert ordering does not affect conventional B-tree storage algorithms.

Figure 5A:
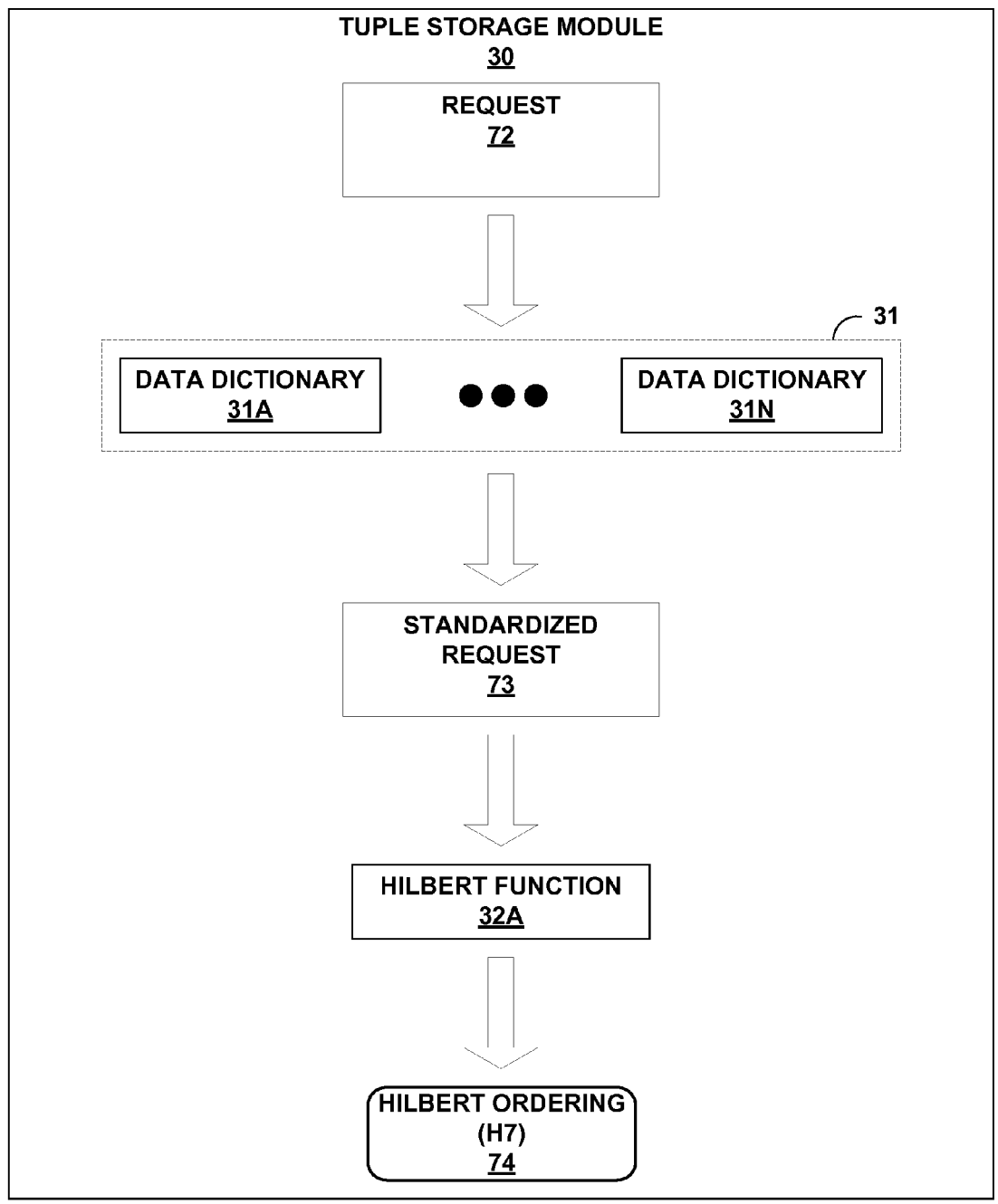
FIGS. 5A-5C are block diagrams illustrating exemplary operation of enterprise planning and performance management in retrieving a multidimensional tuple according to the multidimensional tuple Hilbert ordering principles discussed herein.
Figure 5B:
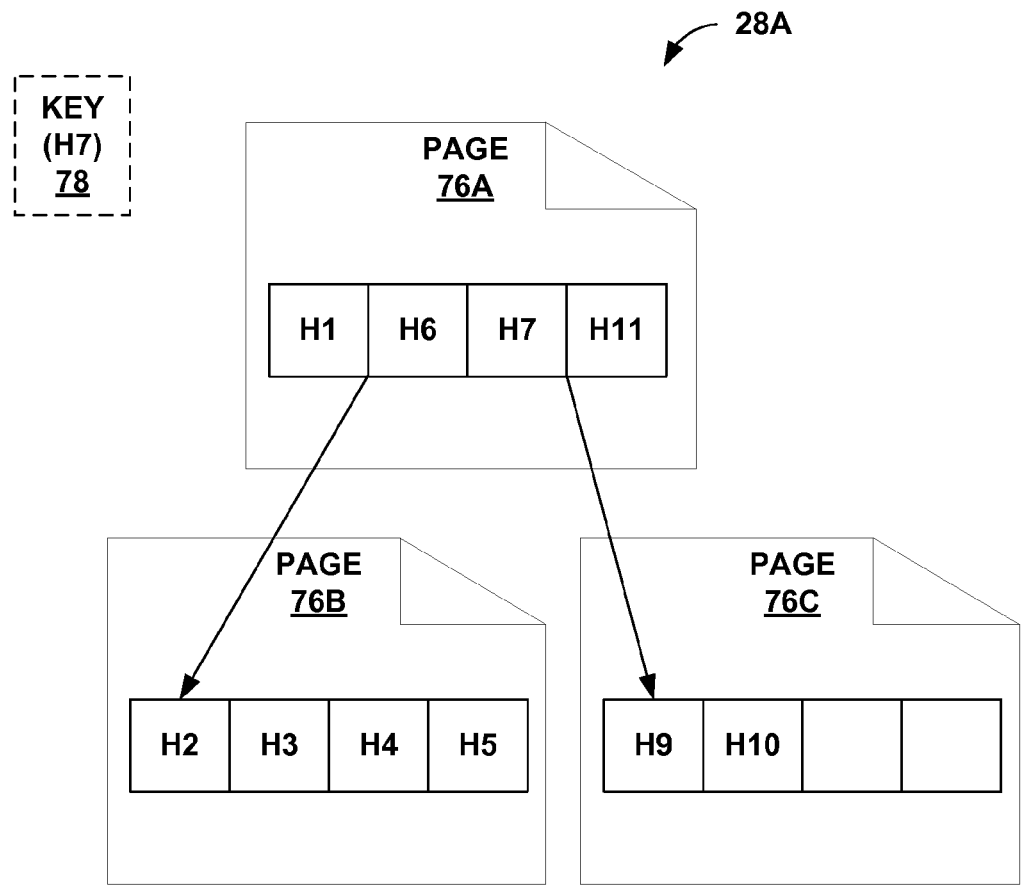
Figure 5C:
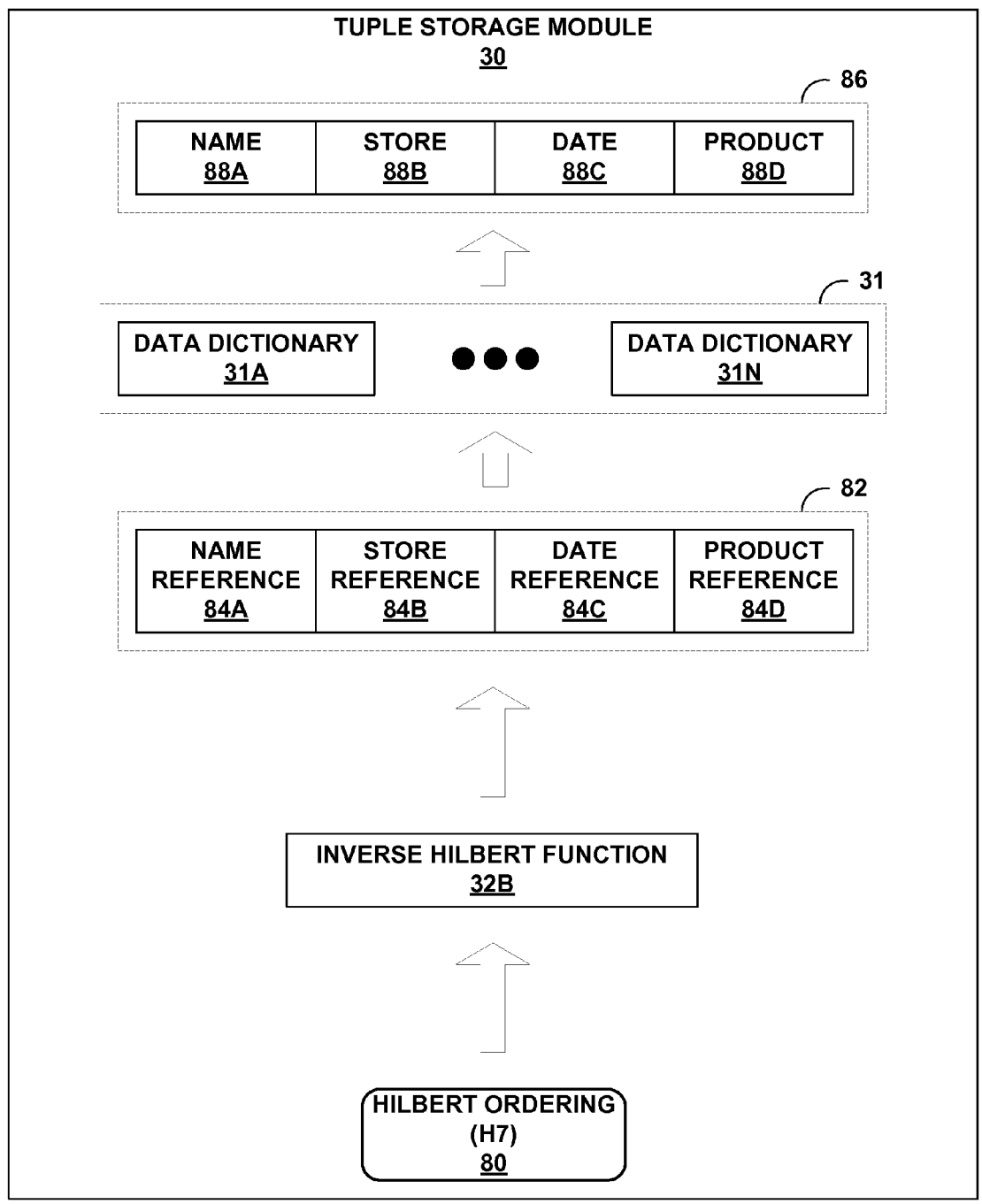

FIGS. 5A-5C are block diagrams illustrating exemplary operation of enterprise planning and performance management 14 in retrieving a multidimensional tuple according to the multidimensional tuple Hilbert ordering principles discussed herein. FIG. 5A illustrates tuple storage module 30 of enterprise planning and performance management system 14 upon receiving a request 72.

As shown in FIG. 5A, tuple storage module 30 receives request 72 and standardizes request 72 by mapping the requested object values to references according to data dictionaries 31, thereby producing standardized request 73 in which the data objects to be matched are represented by reference values. Next, tuple storage module 30 invokes Hilbert function 32A to determine a Hilbert ordering (H7) 74 associated with standardized request 73. Standardized request 73 comprises at least one reference value corresponding to one of the dimensions stored to one of database 28. As described above, standardized request 73 may only include name references of 1, 5, and 7, for example, thereby defining a request for any records having a name references equal to 1, 5, and 7. Although not illustrated in FIG. 5A, Hilbert function 32A, in this instance, may output a series of Hilbert orderings, all of which associate with multidimensional tuples having name references equal to 1, 5, or 7. In the illustrated embodiment, it is assumed that standardized request 73 specifies all necessary identifier values to request only a single tuple. Thus, Hilbert function 32A only returns one Hilbert ordering, i.e., Hilbert ordering 74 or H7.

FIG. 5B illustrates an exemplary current state of B-trees 28A residing within enterprise planning and performance management system 14. B-trees 28A comprise databases pages 76A-76C ("pages 76"), each of which comprises a number of records that are stored in an a sorted order within the pages in accordance with the Hilbert function. Page 76A includes records labeled H1, H6, H7, and H11. Page 76B includes records labeled H2-H5, and page 76C includes records labeled H9 and H10, as well as, two vacant records with no label. The label reflects that a Hilbert ordering is stored to the record. The structure of pages 76 represents a typical B-tree structure. It is assumed for ease of illustration purposes that B-trees 28A has balanced the B-tree and reordered all records to adhere to the typical B-tree ordering. Thus, the record labels suggest the relative Hilbert order, with H1 representing that the lowest relative Hilbert ordering is stored to its record and H11 representing the highest relative Hilbert ordering is stored to its record. Although not illustrated, each of the records may also store other relevant information, such as the price described above.

B-trees 28A also includes key (H7) 78, which it received from tuple storage module 30. Tuple storage module 30 forwards Hilbert ordering (H7) 74 to database servers 22 upon determining Hilbert ordering (H7) 74, whereupon database servers 22 request all records from B-trees 28A matching the Hilbert ordering (H7) 74. B-trees 28A uses Hilbert ordering (H7) 74 as a key (H7) 78. Because key 78 is only stored temporarily, it is illustrated in FIG. 5B as a dashed box. B-trees 28A performs a conventional B-tree search comparing each record it encounters during the search to key 78. Upon finding the record labeled H7 on page 76A, B-trees 28A would determine that a match occurred, and return the Hilbert ordering (H7) stored to the record labeled "H7" within page 76A to database servers 22, as well as, any other relevant information stored in that record. Database servers 22, upon receiving this stored Hilbert ordering, forward the stored Hilbert ordering (H7) to tuple storage module 30. If a match is not found, B-trees 28A indicates that no match occurred, which terminates the process and possibly causes database servers 22 to inform software modules 26 that no match was found.

FIG. 5C again illustrates tuple storage module 30 of enterprise planning and performance management system 14 upon receiving a Hilbert ordering (H7) 80. Tuple storage module 30 invokes inverse Hilbert function 32B, as described above, to transform Hilbert ordering (H7) 80 back into its standardized multidimensional tuple form, or as shown in FIG. 5C, standardized multidimensional tuple 82. Tuple storage module 30 may, in instances where B-trees 28A responds to a request with multiple Hilbert orderings, repeatedly invoke inverse Hilbert function 32B to transform the multiple Hilbert orderings back into their standardized multidimensional tuple forms. Standardized multidimensional tuple 82 comprises references 84A-84D, which are substantially similar to references 69 of FIG. 4B. Because Hilbert function 32A and inverse Hilbert function 32B both map identifier values on a one to one basis, i.e., each unique combination of identifier values correspond to a unique Hilbert ordering and vice versa, tuple storage module 30 ensures that no data is lost while transforming Hilbert ordering 80. Accordingly, the processes implemented by tuple storage module 30 do not affect conventional B-tree retrieval techniques, but only transform multidimensional data such that storage within the B-tree becomes more local given multiple dimensions.

Once transformed, tuple storage module 30 again accesses data dictionaries 31 to determine the object values associated with references 84A-84D, i.e., maps references 84A-84D back to the original object value forms or objects 88A-88D. Objects 88A-88D may be similar in form to objects 68A-68D. Thus, tuple storage module 30 returns multidimensional tuple 86 to database servers 22, thereby completing the tuple retrieval process according to the multidimensional tuple Hilbert ordering principles discussed herein.

Accordingly, the above described multidimensional tuple Hilbert ordering techniques order the multidimensional tuples within the linear storage structure, e.g., the B-tree data storage structure, such that similar tuples remain local to one another and most likely within the same database page. Thus, when the system retrieves a page of multidimensional tuples, it maintains accesses a page of similar tuples instead of a page of tuples that are similar in only one respect or dimension, as in conventional systems. As database queries frequently request tuples similar in more than one respect, the techniques thereby enable more consistent and efficient access of multidimensional tuples.

Although described above in reference to various components within an enterprise planning and performance management system, the principles of the invention may include other embodiments of the above described multidimensional tuple Hilbert ordering. For example, another embodiment includes a computer-readable medium for storing instructions that cause a processor to perform the multidimensional tuple Hilbert ordering described above. Various embodiments of the invention have been described. These and other embodiments are within the scope of the following claims.

The invention claimed is:

1. A method comprising:
   receiving multidimensional data elements, wherein each multidimensional data element is defined by a plurality of objects having different object types, wherein each object type is associated with a different dimension within a multidimensional data space, and wherein an object value is stored to each object;
   forming a respective tuple for each of the multidimensional data elements by mapping each object value to an associated reference;
   applying, with a processor, a Hilbert function to two or more of the references of each of the tuples to determine a respective Hilbert ordering for each of the tuples; and
   storing each of the Hilbert orderings to a respective record within a tree data structure allocated within a linear data storage structure,
   wherein the tree data structure comprises a plurality of pages, wherein the plurality of pages comprises a first page having a first record corresponding to a first Hilbert value and a second record corresponding to a second Hilbert value, wherein the plurality of pages further comprises a second page having a third record corresponding to a third Hilbert value, and wherein the third Hilbert value is greater than the first Hilbert value and less than the second Hilbert value.

2. The method of claim 1, wherein applying the Hilbert function comprises applying the Hilbert function to all of the references of the tuple.

3. The method of claim 1, wherein applying the Hilbert function comprises applying the Hilbert function to a subset of the references of the tuple.

4. The method of claim 3, wherein applying the Hilbert function comprises selecting the subset of references to which to apply the Hilbert function based on a size of the respective dimension associated with each of the references.

5. The method of claim 1, further comprising:
   receiving a request for the tuple, wherein the request includes one or more object values;
   forming a standardized request by mapping each object value of the request to an associated reference;
   applying the Hilbert function to the references of the standardized request to determine a request Hilbert ordering for the standardized request;
   retrieving a requested Hilbert ordering from the tree data structure based on the determined request Hilbert ordering.

6. The method of claim 5, wherein retrieving the requested Hilbert ordering comprises:
   determining whether the request Hilbert ordering resides within the tree data structure; and
   retrieving the requested Hilbert ordering from the tree data structure based on the determination.

7. The method of claim 6, further comprising forming the requested tuple by applying an inverse Hilbert function to the retrieved Hilbert ordering to determine the references that form the requested tuple.

8. The method of claim 7, further comprising determining the object values associated with the requested tuple by mapping the references of the requested tuple back to their associated object values.

9. The method of claim 1, wherein storing the Hilbert ordering comprises storing the Hilbert ordering to a B-tree data storage structure within an on-line analytical processing (OLAP) database.

10. The method of claim 1, wherein the multidimensional data elements comprise a first multidimensional data element that is associated with a measure, and wherein a record within the tree data structure to which the first multidimensional data element is stored stores the respective measure associated with the first multidimensional data element.

11. The method of claim 1, wherein the Hilbert orderings are used as keys to search the tree data structure.

12. A system comprising:
a programmable processor;
a linear storage structure that includes a B-tree for storing multidimensional data;
a tuple storage module, executing on the programmable processor, that receives multidimensional data elements to store to the B-tree, where each multidimensional data element is defined by a plurality of objects having different object types, wherein each object type is associated with a different dimension within a multidimensional data space, and wherein an object value is stored to each object,
wherein the tuple storage module forms a respective tuple for each of the multidimensional data elements at least in part by mapping each object value to an associated reference, applies a Hilbert function to two or more of the references of each of the tuples to determine a respective Hilbert ordering for each of the tuples, and stores each of the Hilbert orderings to a respective record within the B-tree,
wherein the tuple storage module applies the Hilbert function to a subset of the references of the tuple, and
wherein the subset of references is selected based on a size of the respective dimension associated with each of the references.

13. The system of claim 12,
wherein the tuple storage structure further receives a request for the tuple, wherein the request includes one or more object values, forms a standardized request by mapping each object value of the request to an associated reference, and applies the Hilbert function to the references of the standardized request to determine a request Hilbert ordering for the standardized request, and
wherein the B-tree retrieves a requested Hilbert ordering based on the determined request Hilbert ordering.

14. The system of claim 13, wherein the B-tree retrieves the requested Hilbert ordering by:
determining whether the request Hilbert ordering resides within the B-tree; and
retrieving the requested Hilbert ordering from the B-tree based on the determination.

15. The system of claim 13, wherein the tuple storage system further forms the requested tuple by applying an inverse Hilbert function to the retrieved Hilbert ordering to determine the references that form the requested tuple.

* * * * *